(12) United States Patent  (10) Patent No.: US 12,445,543 B2
Fleurbaaij et al.  (45) Date of Patent: Oct. 14, 2025

(54) METHOD AND SYSTEM FOR TRANSMITTING A RESPONSE MESSAGE

(71) Applicant: Optiver IP B.V., Amsterdam (NL)

(72) Inventors: Dennis Fleurbaaij, Amsterdam (NL); Andrew John Alexander McCaffrey, Amsterdam (NL)

(73) Assignee: Optiver IP B.V., Amsterdam (NL)

( * ) Notice: Subject to any disclaimer, the term of this patent is extended or adjusted under 35 U.S.C. 154(b) by 0 days.

(21) Appl. No.: 18/264,574

(22) PCT Filed: Sep. 29, 2022

(86) PCT No.: PCT/EP2022/077188
§ 371 (c)(1),
(2) Date: Aug. 7, 2023

(87) PCT Pub. No.: WO2023/117165
PCT Pub. Date: Jun. 29, 2023

(65) Prior Publication Data
US 2024/0056515 A1 Feb. 15, 2024

(30) Foreign Application Priority Data

Dec. 22, 2021 (NL) .................................. 2030225

(51) Int. Cl.
*G06F 15/173* (2006.01)
*H04L 45/00* (2022.01)
(Continued)

(52) U.S. Cl.
CPC .............. *H04L 69/22* (2013.01); *H04L 45/66* (2013.01); *H04L 69/02* (2013.01)

(58) Field of Classification Search
CPC .......... H04L 69/22; H04L 45/66; H04L 69/02
(Continued)

(56) References Cited

U.S. PATENT DOCUMENTS 6,263,396 B1 * 7/2001 Cottle .............. H04N 21/42653
348/E5.005
6,813,276 B2 * 11/2004 Chang ................ H04Q 11/0062
398/58
(Continued)

FOREIGN PATENT DOCUMENTS

WO 2017024361 A1 2/2017

OTHER PUBLICATIONS

Ingram et al. "Parallel Header Processing in An All-Optical Packet Switch", IEEE Africon 2004, 2004, pp. 991-994.
(Continued)

*Primary Examiner* — Kaylee J Huang
(74) *Attorney, Agent, or Firm* — Steven M. Koehler; Westman, Champlin & Koehler, P.A.

(57) ABSTRACT

A method transmits a response message in response to an incoming message. A header portion of the incoming message is identical to a header portion of the response message. A payload of the incoming message is different from a payload of the response message. The method splits an incoming physical signal representing the incoming message into a first and a second copy. The first copy is provided to a transmitter system. Further, the method generates a signal and, based on determining that a message is received from at least part of the second copy, provides the generated signal to the transmitter system so that the generated signal is transmitted after at least part of the first copy's header part has been transmitted. The transmitted at least part of the first copy's header part and the transmitted generated signal together form a transmitted response signal representing the response message.

19 Claims, 4 Drawing Sheets

(51) Int. Cl.
*H04L 69/00* (2022.01)
*H04L 69/22* (2022.01)

(58) Field of Classification Search
USPC .......................................... 709/224, 223, 238
See application file for complete search history.

(56) References Cited

U.S. PATENT DOCUMENTS

| | | | | |
|---|---|---|---|---|
| 7,330,661 | B1 * | 2/2008 | Jackson | H04B 10/1149 |
| | | | | 398/118 |
| 8,423,617 | B2 * | 4/2013 | Forlivesi | H04L 69/08 |
| | | | | 307/413 |
| 10,298,456 | B1 * | 5/2019 | Chang | H04L 45/38 |
| 10,454,833 | B1 * | 10/2019 | Bosshart | H04L 49/3063 |
| 10,873,613 | B2 * | 12/2020 | Pope | H04L 69/161 |
| 2002/0083345 | A1 * | 6/2002 | Halliday | H04L 63/0209 |
| | | | | 713/150 |
| 2004/0030754 | A1 | 2/2004 | Ree | |
| 2011/0013690 | A1 * | 1/2011 | Kobayashi | H04L 25/4917 |
| | | | | 375/240 |
| 2021/0007026 | A1 * | 1/2021 | Kho | H04W 36/12 |
| 2022/0060282 | A1 * | 2/2022 | Takahashi | H04L 45/74 |

OTHER PUBLICATIONS

International Search Report and Written Opinion in Corresponding International Application No. PCT/EP2022/077188 dated Nov. 21, 2022.

* cited by examiner

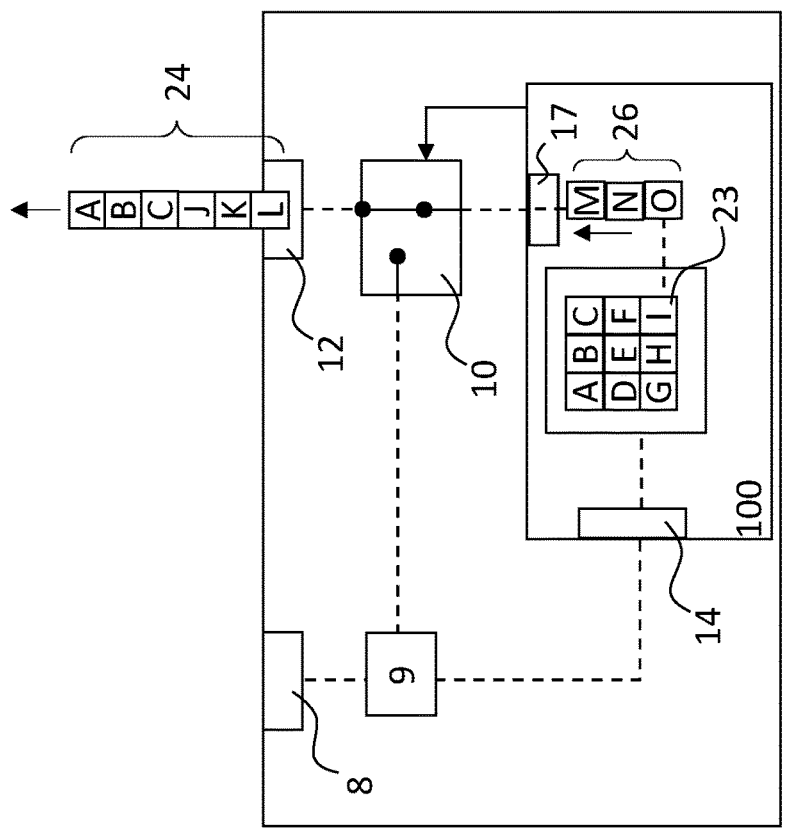
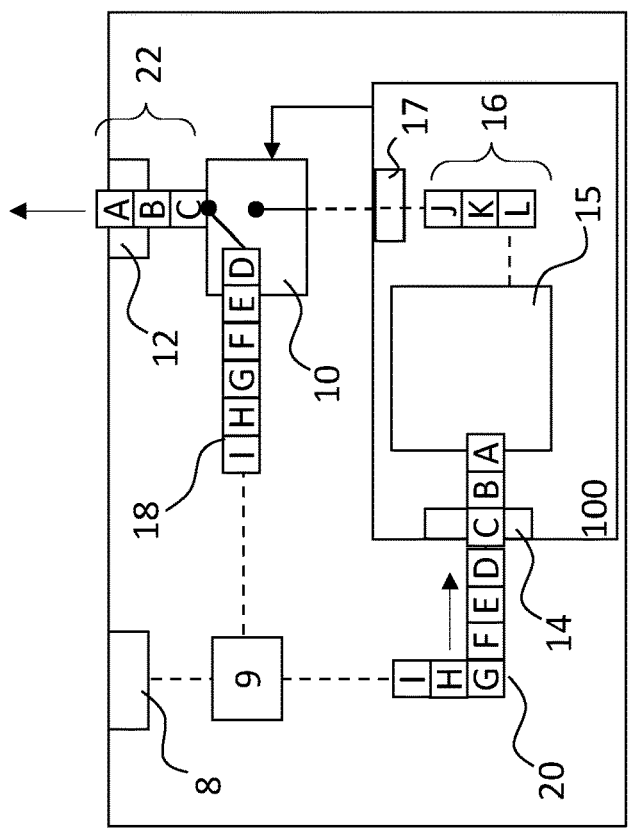
Fig. 4
Fig. 3

METHOD AND SYSTEM FOR TRANSMITTING A RESPONSE MESSAGE

CROSS-REFERENCE TO RELATED APPLICATION(S)

The present application is a Section 371 National Stage Application of International Application No. PCT/EP2022/077188, filed Sep. 29, 2022 and published as WO 2023/117165 A1 on Jun. 29, 2023, and further claims priority to Netherlands patent application no. 2030225, filed Dec. 22, 2021.

FIELD OF THE INVENTION

This disclosure relates to a method and system for transmitting a response message in response to an incoming message, in particular to such a method and system in which at least part of a copy of the incoming physical signal is re-used as part of the response signal representing the response message.

BACKGROUND

Ultrafast communication is highly important in many fields, for example in the field of trading. In trading, a so-called liquidity provider has a risk of adverse selection. When the price of a product on a market changes, a liquidity provider will desire to update its active bids and offers on the market as quickly as possible to prevent that deals are made based on the "old" prices, which may cause losses. In light of this, it is of no surprise that liquidity providers have a desire to communicate with an exchange as fast as possible.

Of course, trading is just one many fields that may benefit from ultrafast communication. Hence, there is a need in the art for methods and systems that enable fast communication.

SUMMARY

To that end a method is disclosed for transmitting a response message in response to an incoming message. The incoming message comprises a header portion and a payload and the response message also comprises a header portion and a payload. The header portion of the incoming message is identical to the header portion of the response message. The payload of the incoming message is different from the payload of the response message. The method comprises receiving an incoming physical signal representing the incoming message. This step comprises receiving a header part of the incoming physical signal, the header part representing the header portion of the incoming message, and thereafter receiving a payload part of the incoming physical signal, the payload part representing the payload of the incoming message. The method also comprises splitting the incoming physical signal into a first copy of the incoming physical signal and a second copy of the incoming physical signal. The method further comprises providing the first copy of the incoming physical signal to a transmitter system so that at least part of the first copy's header part is transmitted. The method further comprises interpreting at least part of the second copy of the incoming physical signal to determine that a message is received. Further, the method comprises generating a signal and, based on determining that a message is received, providing the generated signal to the transmitter system so that the generated signal is transmitted after the at least part of the first copy's header part has been transmitted. Herein, the transmitted at least part of the first copy's header part and the transmitted generated signal together form a transmitted response signal representing the response message.

One aspect of this disclosure relates to a system for transmitting a response message in response to an incoming message. The incoming message comprises a header portion and a payload. The response message also comprises a header portion and a payload, wherein the header portion of the incoming message is identical to the header portion of the response message. The system comprises an input for receiving an incoming physical signal representing the incoming message. The incoming physical signal comprises a header part, the header part representing the header portion of the incoming message, and a payload, the payload part representing the payload of the incoming message. The system further comprises a transmitter system for transmitting a transmitted response signal representing the response message. Further, the system is configured to
 split the incoming physical signal into a first copy of the incoming physical signal and a second copy of the incoming physical signal, and
 provide the first copy of the incoming physical signal to a transmitter system so that at least part of the first copy's header part is transmitted. The system further comprises a data processing system configured to
 interpret at least part of the second copy of the incoming physical signal to determine that a message is received, and to
 generate a signal, and to
 based on determining that a message is received, cause the system to provide the generated signal to the transmitter system so that the generated signal is transmitted after the at least part of the first copy's header part has been transmitted. The transmitted at least part of the first copy's header part and the transmitted generated signal together form a transmitted response signal representing the desired response message.

This method and system enable to send out a response message very fast in response to an incoming message. The inventors have realized that if the header parts of the incoming message and the response message are identical, then the header part of the incoming physical signal can be directly sent, preferably without any interpretation of the header part of the incoming physical signal, to a transmitter system that can directly transmit back the header part of the incoming physical signal as header part of the response signal. In this way, by the time that the system determines, based on the second copy of the incoming physical signal, that a message is received, at least a part of the header part of the response signal, which header part represents the header portion of the response message, will already have been transmitted. At some point, the first copy of the incoming physical signal should not be transmitted anymore, else merely a copy of the incoming message will be transmitted as response message, which is not the aim of this method. Hence, the method comprises generating a signal, part of which may be determined based on the payload of the incoming message, and providing this generated signal to the transmitter system in such manner, e.g. with such timing that the already transmitted part of the first copy of the incoming physical signal and the generated signal together form a valid transmitted response signal representing the response message. In any case, since at least part of the header part of the incoming physical signal is directly used for transmission, the response message will have been completely transmitted at an earlier time than would be the case if the header part of the response signal would have been generated by the system itself. Generating a signal namely takes time.

Any portion of the incoming message that differs from any portion of the response message may be understood as belonging to the payload of the incoming message. Further, any portion of the response message that differs from any portion of the incoming message may be understood as belonging to the payload of the response message.

The system may comprise one or more elements to amplify and/or denoise the incoming and outgoing physical signals or its copies. Such amplification and/or denoising may serve to ensure signal integrity when the signal is sent by the transmitter system. To this end, also a filter may be implemented in the system. The amplifiers and filters depend on the signal method and physics.

The incoming message may come from a computer system of an exchange and the payload of the incoming message may indicate market information. Similarly, the payload of the response message may be transmitted by a computer system of a trading company in which case the payload of the response message typically comprises updates to bid and/or offer prices.

It should be appreciated that since the incoming physical signal comprises the header part representing the header portion of the incoming message, the first copy also comprises this header part.

The incoming physical signal may represent a bit stream.

A physical signal as used herein may be understood to refer to variations, preferably variations in time, of a physical quantity wherein the variations are used to convey information. Typically, a transmission medium carries such variations from a sender device to a receiver device. A physical signal is for example formed by voltage variations in an electrical conductor and/or for example formed by variations of light intensity of light travelling through an optical conductor, such as an optical fiber cable. As used herein, a part of a signal may refer to some time period in which variations forming the signal are occurring, however, wherein variations forming the signal are also occurring outside of this time period.

Also, if a physical signal refers to variations of a physical quantity, then a copy of this physical signal may be understood to refer to the same variations of the same physical quantity.

As used herein, interpreting a physical signal may be performed by quantizing the signal and/or sampling the signal. In case both quantization and sampling are performed, interpreting a physical signal may be understood to be performed by converting the physical signal into a digital signal. Sampling may be understood as reducing a continuous-time signal to a discrete-time signal. Quantizing may be understood as mapping input values from a first, typically continuous, set of values to output values in a (countable) smaller set. In case the incoming physical signal represents a bit stream, quantizing may be understood to comprise mapping input values, e.g. light intensity values in case of an optical signal, to a "0" value or a "1" value. Thus, Deserialization may be understood as the process of reconstructing a data structure or object from a signal, e.g. a signal representing a series of bytes or a string, in order to instantiate the data structure or object. This is the reverse process of serialization, i.e., converting a data structure or object into a signal, e.g. into a series of bytes, for storage or transmission across devices. It should be appreciated that deserializing a signal requires interpreting the signal, because the transformation from serial to parallel requires knowledge of the different values represented by the signal. Also, any logical operations that are to be performed based on a signal, such as determining a payload for the response message based on the incoming physical signal, requires interpretation of the incoming physical signal.

Interpreting a signal thus optionally comprises deserializing the signal. Additionally or alternatively, interpreting a signal optionally comprises decoding the signal.

Once a signal has been interpreted, e.g. converted into a digital format, information, a data structure or object may be reconstructed based on the digital signal.

The incoming message as well as the response message may be embodied as an Ethernet packet, as for example defined in standard IEEE 802.3-2018—IEEE Standard for Ethernet. In such case, the header portion of the incoming and response message may be the seven-octet Ethernet packet preamble, which is the same for every Ethernet packet. Preferably, the response message and the response signal comply with the IEEE standard for 10G-BASE-LR, in particular with the IEEE Standard for Ethernet 802.3 section 4.

The generated signal optionally comprises a header part that represents at least a part of the header portion of the response message. This may be required if for example the generated signal is provided to the transmitter system before the entire first copy's header part has been transmitted by the transmitter system by means of transmitting the first copy. If the complete header part representing the header portion of the response message has not been transmitted yet, then still a remaining header part should be transmitted. This remaining header part should then be present in the generated signal.

The generated signal typically comprises a payload part representing the payload of the response message.

The method may comprise, and the data processing system of the system may be configured for, determining that a message is received based on a header part of the interpreted signal representing the header portion of the incoming message, e.g. the Ethernet preamble referred to above. For example, the data processing system may be configured to detect Ethernet preambles in order to determine that a message is being received.

Of course, the incoming physical signal may be split into further copies as well, for example into a third copy, fourth copy, et cetera.

In an embodiment of the method (i) the incoming physical signal is not interpreted before splitting the incoming physical signal into the first copy and second copy, and/or (ii) splitting the incoming physical signal does not involve interpreting the incoming physical signal, and/or (iii) the first copy of the incoming physical signal is not interpreted before and not interpreted during transmitting the at least part of the first copy's header part.

In an embodiment of the system, the system is configured to not interpret the incoming physical signal before the incoming physical signal is split into the first copy and second copy, and/or to split the incoming physical signal without interpreting the incoming physical signal, and/or to not interpret the first copy of the incoming physical signal before and not interpret the first copy during transmission of the at least part of the first copy's header part.

These embodiments allow to directly send back at least the header part of the incoming physical signal without losing any time for interpreting the signal and thus enables very fast responses. Such interpretation typically involves converting the incoming physical signal into a digital format which takes more time than not interpreting.

Thus, in these embodiments, the physical signal is typically not quantized and/or not sampled and/or not digitized and/or not deserialized.

In an embodiment of the method, the generated signal comprises a predefined part that has already been defined before determining that a message is received, said predefined part of the generated signal being generated based on prestored data representing at least part of the response message's payload.

In an embodiment of the system, the data processing system comprises a storage medium having stored thereon—already before the data processing system determines that a message is received—data representing at least part of the response message's payload. In this embodiment, the data processing system is configured to generate the signal based on the prestored data.

To illustrate, this predefined part may be a part of the response message that indicates the destination and/or source address for the response message. The destination address may be known beforehand, for example. Upon determining that a message is received, yet without having inspected the payload of the incoming message, the system can already generate the predefined part of the response signal, e.g. the part that represents the destination address for the response message.

As explained above, the response signal may comprise a payload part representing the payload of the response message. The predefined part of the generated response signal may comprise a predefined payload message part, which predefined payload part represents a predefined part of the payload portion of the response message. Additionally or alternatively, the predefined part of the generated response signal may comprise a part representing at least part of the header portion of the response message.

This embodiment is especially advantageous in case the predefined part of the generated signal comprises a predefined payload part representing a predefined part of the response message's payload part, e.g. indicating a default destination address for the response message. This namely allows to already transmit this predefined part of the serialized signal while the payload of the incoming message is still being received and processed, e.g. while a payload of the response message is still being determined. The transmittal of the predefined payload part may be understood to give the data processing system more time to determine an appropriate payload for the response message based on the payload of the incoming message.

It should be appreciated that it is not per se required that the generated signal comprises a predefined part.

In an embodiment, the method comprises interpreting at least part of the second copy of the incoming physical signal to determine at least part of the incoming message, and determining, based on the determined at least part of the incoming message, at least part of the payload of the response message. Likewise, in an embodiment of the system, the data processing system is configured to determine at least part of the incoming message, and to determine, based on the determined at least part of the incoming message, at least part of the payload of the response message.

In an embodiment, the method comprises interpreting at least part of the second copy of the incoming physical signal to determine at least part of the header and/or at least part of the payload of the incoming message, and determining, based on the determined at least part of the header and/or the determined at least part of the payload, at least part of the payload of the response message. Likewise, in an embodiment of the system, the data processing system is configured to determine at least part of the payload of the response message based on the interpreted part of the second copy of the incoming physical signal.

These embodiments allow the system to base its response on the contents of the payload of the incoming message.

In particular, it may be understood that, in these embodiments, the generated signal is generated based on the determined payload of the response message.

Each of the incoming physical signals, the first and second copy of the incoming physical signal, the generated signal and the transmitted response signal may be a physical signal representing a bit stream.

In an embodiment, the method comprises synchronizing the generated signal to the first copy of the incoming physical signal.

In an embodiment of the system, the system is configured to synchronize the generated signal to the first copy of the incoming physical signal. To this end, the system may comprise a delay line for delaying the provisioning of the first copy to the transmitter system.

This embodiment enables to accurately line up the first copy of the incoming physical signal and the generated signal together to from the response signal representing the response message in such manner, that the response signal, which may be understood to be a combination of the first copy of the incoming signal and the generated signal, represents a proper signal to the receiver. A proper signal may be understood to refer to a signal which the receiver of the signal can interpret, adhering to all requirements stemming from the receiver's specifications. An example of this could be ethernet over optical fiber.

In an embodiment, the method comprises, based on determining that a message is received, switching from (i) providing the first copy of the incoming physical signal to the transmitter system to (ii) providing the generated signal to the transmitter system.

In an embodiment of the system, the system further comprises a switch for controlling whether or not the first copy of the incoming physical signal is provided to the transmitter and for controlling whether or not the generated signal is provided to the transmitter system. In such embodiment, the data processing system may be configured to cause the system to provide the generated signal to the transmitter system by sending a control signal to the switch.

The switch may be configured to select either one of providing the first copy or the generated signal to the transmitter system for transmittal.

In these embodiments, it may be understood that, after the switch, the generated signal is provided to the transmitter system instead of the first copy.

The switch needs to be suitable for the physical medium of the signals, e.g.: single ended electrical, balanced electrical, optical, pressure in any matter phase state, neutrinos, tachyons etc. Any type of switch can be selected as long as it can control whether or not the first copy of the incoming physical signal is provided to the transmitter and whether or not the response generated signal is provided to the transmitter system.

The switch may be a switch system in the sense that it may comprises several sub-switches, for example a first sub-switch for controlling whether or not the first copy of the incoming physical signal is provided to the transmitter system and a second sub-switch for controlling whether or not the generated signal is provided to the transmitter system.

Preferably, the switching is performed such that the transmitted response signal does not comprise interruptions which cause receiving errors at a receiving system that receives the response signal. Thus, preferably, the switch is configured to switch such that the transmitted response signal can be correctly interpreted by a receiver, e.g. such that it does not comprise interruptions which cause receiving errors at a receiving system that receives the response signal.

Preferably, the generated signal is synchronized, e.g. bit aligned, with the incoming signal such that the transmitted response signal can be correctly interpreted by a receiver. To this end, the method may comprise synchronizing, e.g. bit aligning, the generated signal with the incoming signal.

The incoming physical signal may be an electrical signal. The incoming physical signal may be a light signal. The incoming physical signal may be a sound signal.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as portion of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In one aspect, embodiments of the present invention may relate to a computer-implemented method for determining that a message is received.

Moreover, a computer program for carrying out the methods described herein, as well as a non-transitory computer readable storage-medium storing the computer program are provided. A computer program may, for example, be downloaded (updated) to the existing systems or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which:

FIGS. 1-5 illustrate a system and method according to an embodiment;

DETAILED DESCRIPTION OF THE DRAWINGS

In the figures, identical reference numbers indicate identical or similar elements.

FIG. 1-5 schematically show a system for transmitting a response message in response to an incoming message according to an embodiment. FIGS. 1-5 also schematically illustrate a method for transmitting a response message in response to an incoming message according to an embodiment in that FIGS. 1-5 illustrate different states of the system 1 while the method according to an embodiment is performed.

The system 1 in FIG. 1-5 comprises an input 8 for receiving an incoming physical signal. The input 8 may be an input port, for example. However, the input may also simply be the place where the incoming physical signal enters the system 1. This signal may be an electrical signal or an electromagnetic signal, such as a light signal. An electrical signal may use current and/or voltage variations in order to convey information. An electromagnetic signal may use variations in radiant power of electromagnetic radiation, such as variation in light intensity, in order to convey information. The incoming physical signal may be provided to the system via electrical conductors in the case of electrical signals and via optical conductors, such as optical fiber cables, in the case of electromagnetic signals. The incoming physical signal may be a bit stream. Such bit stream may represent an ethernet packet.

Figure 1:
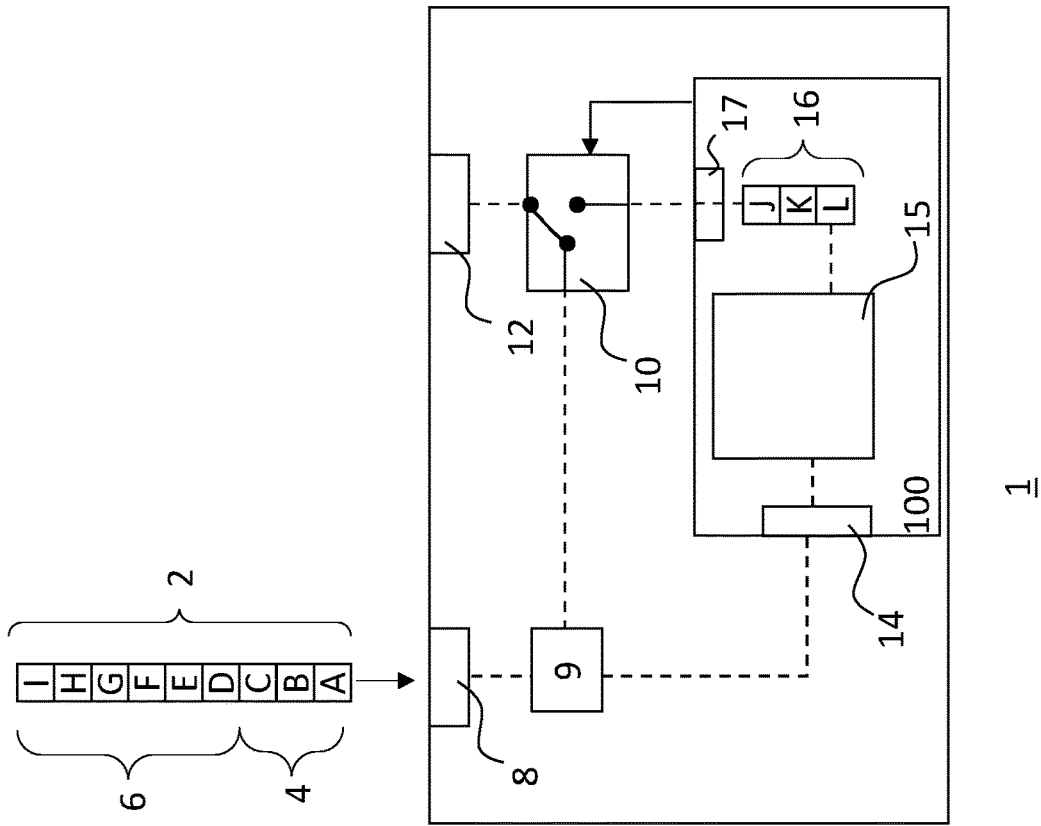

The incoming physical signal represents the incoming message 2. This may be understood as that the incoming signal conveys information based on which the incoming message can be reconstructed. The incoming message 2 comprises a header portion 4 and a payload 6. In FIG. 1, the header portion comprises, for illustrative purposes, three bits A, B and C, and the payload 6 comprises six bits D, E, F, G, H, I. Thus, it should be appreciated that the incoming physical signal comprises a header part representing the header portion 4 and a payload part representing the payload 6. The header part of the incoming physical signal is received before the payload part.

The system 1 further comprises a splitter 9 for splitting the incoming physical signal into a first copy and a second copy, a transmitter system 12 for transmitting transmitted response signal representing the response message, a switch 10, a data processing system 100. The transmitter system 12 may be an output port of the system 1. However, the transmitter system may also simply be embodied for example as optical wires and/or electrical wires that lead the convey the response signal out of the system 1.

In the depicted system, the data processing system 100 is shown to comprise a deserialization module 14, which is configured to interpret at least part of the second copy of the incoming physical signal, in particular to deserialize the second copy of the incoming physical signal. The deserialization module 14 is preferably also configured to convey information to the logic 15 in a form which the logic 15 can process. The deserialization module 14 may for example be configured to digitize the second copy of the incoming signal, and thus to determine a digital signal based on the second copy of the incoming physical signal and then to convey this digital signal to the logic 15 in a form which the logic 15 can process.

In the depicted system, the data processing system 100 is shown to comprise a serialization module 17 which is configured to serialize a part of the response message as determined by the data processing system 100 in order to generate the signal, also referred to herein as the "generated signal".

FIG. 1 further shows that the data processing system has stored data 16 which, as will be explained later, will turn out to be data 16 representing at least part of the response message's payload. It should be appreciated that this pre-stored data is optional. There may be no pre-stored data. The pre stored data 16 may be used to generate part of the response signal. Data 16 may be stored on non-transitory computer readable storage media (not shown) of data processing system 100.

Figure 2:
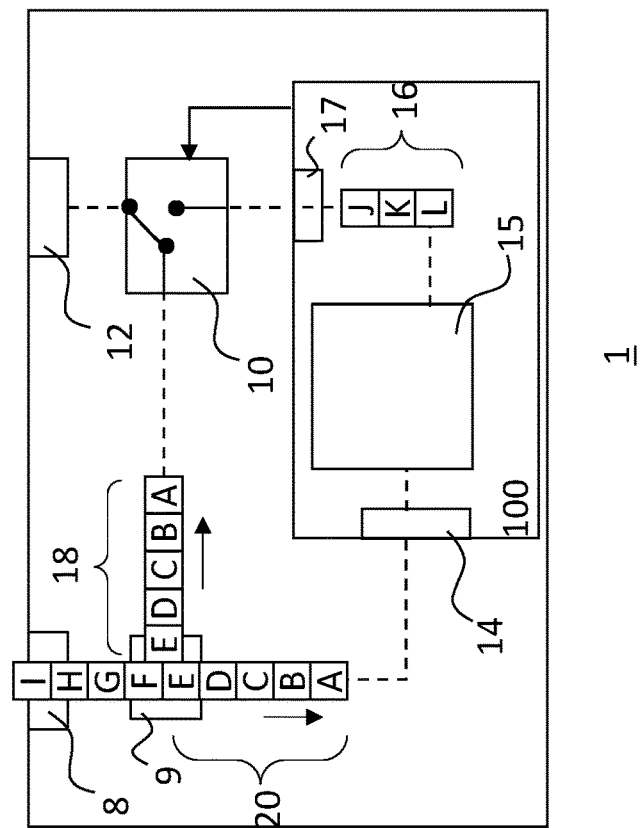

FIG. 2 illustrates that the system 1 is configured to split the incoming physical signal into a first copy 18 of the incoming physical signal and a second copy 20 of the incoming physical signal. Any suitable element that can split the incoming physical signal may be used, given a certain type of incoming physical signal. In case the incoming physical signal is an electrical signal then the splitter 9 may comprise a buffer, for example, to split the incoming electrical signal into a first copy and second copy. In case of optical signals, such splitting of the signal may be performed by using optical splitters known in the art. The first and second copy of the incoming physical signal may still represent bit streams once they are interpreted. Also, it should be appreciated that the splitting does not involve interpreting the incoming physical signal and thus does not involve any deserialization.

FIG. 3 illustrates that the first copy 18 is provided to the transmitter system 12 so that at least part of the first copy's header part is being transmitted. In the depicted example, the entire header part, representing bits A, B, C is provided to the transmitter system 12 and thus transmitted. In the depicted example, no interpretation of the first copy of the incoming physical signal is performed, thus also no deserialization is performed on the first copy of the incoming physical signal. The incoming physical signal is thus directly fed back to the transmitter system 12 so that it is transmitted. In the depicted example, the first copy 18 is provided to the transmitter system 12 via switch 10.

FIG. 3 further shows that the second copy 20 of the incoming physical signal is provided to data processing system 100, in particular to a deserializer module 14 that will interpret, in particular deserialize, the incoming physical signal. After at least part of the second copy 20 has been interpreted, it is provided to logic 15, which is configured to determine that a message is received. The logic 15 is for example configured to recognize a bit pattern as a header portion of an incoming message. It should be appreciated that for the logic 15 to determine that a message is received, it is not necessary that the entire second copy of the incoming physical signal is interpreted.

FIG. 4 illustrates that the module 14 has deserialized the second copy of the incoming physical signal 20. The data processing system 100 can determine, based on the interpretation of the second copy of the incoming signal, that a message is received.

Based on determining that a message is arriving, the data processing system 100 may start to generate a signal. In any case, based on determining that a message is received, the data processing system 100 may cause a switch from (i) providing the first copy of the incoming physical signal to the transmitter system to (ii) providing the generated signal to the transmitter system 12. The data processing system 100 is configured to control the switch 10 as indicated by the arrow from data processing system 100 to the switch 10.

Figure 5:
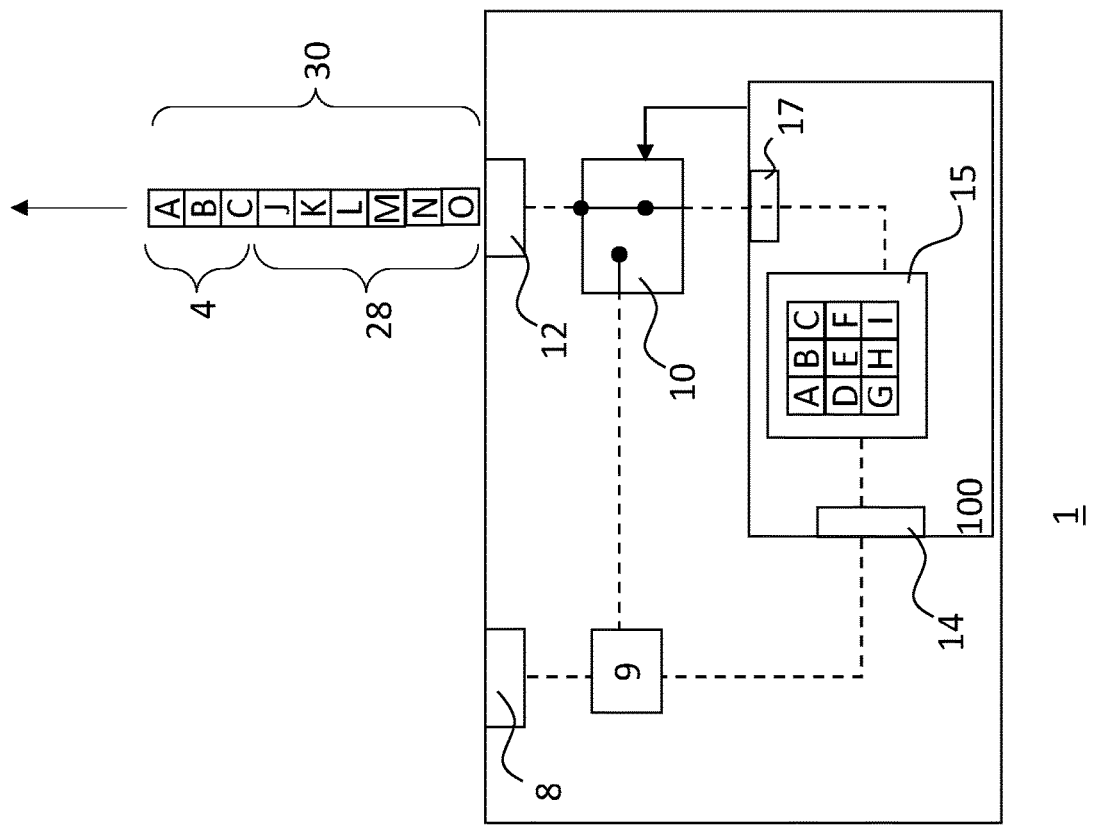

The generated signal in the depicted example represents the payload 28 of the response message 30 (also see FIG. 5). In this example, the generated signal comprises a predefined part that has already been defined before determining that a message is received, namely a part generated based on prestored data 16. This part represents part of the payload 28 of the response message 30. In the depicted example, this part of the payload which is predefined consists of bits J, K, L. It should be appreciated, however, that the pre-stored data 16 and the predefined part are optional.

In FIG. 4, the data processing system 100, in particular the logic 15, determines, based on the interpreted second copy of the incoming physical signal, a part 26 of the payload 28 of the response message 30. In the depicted example, this part of the payload that is determined by the data processing system 100 consists of bits M, N, O. In this example, part 28 is determined based on an at least partially determined header and/or on an at least partially determined payload of the incoming message. However, it should be appreciated that the system can also determine at least part of the payload, or the entire payload, of the response message without knowing what bits are in the header or payload of the incoming message. In an example, if the data processing system is unable to determine the bits of the header and/or payload, e.g. due to noise, it will determine a default payload of the response message, for example, which indicates that a message was not well-received.

The data processing system 100 may be understood to generate the signal by first determining the payload portion 28 (FIG. 5) of the response message and then generating the signal representing this determined payload portion 28. In particular, the generated signal may be generated by a serialization module 17 as shown. It should be appreciated that the data processing system may generate multiple signals, optionally based on the contents of the incoming message, after which the data processing system selects one of these multiple generated signals in order to provide the selected signal to the transmitter system. In such case, the data processing system may comprise multiple parallel signal generators.

The switch 10 is controlled such that right after the header part of the response signal representing bits A, B, C has been transmitted, the generated signal representing bits J, K, L, M, N, O are transmitted. To this end, the system may be configured to synchronize the generated signal to the first copy of the incoming physical signal. These signals are aligned in such a way that to the receiver it is interpretable. It should be appreciated that, for clarity, FIG. 4 depicts bits L and M separately from each other, however, they are transmitted back-to-back as shown in FIG. 5 such that in the response message, bit M follows bit L in manner compliant with the applicable transmission protocol In order to get the timing correct of the generated signal as well as the timing of the switch, the data processing system 100 may receive a copy of the transmitted response signal from the transmitter system 12. (This is not shown in FIGS. 1-5.) The data processing system 100 can then determine whether the transmitted response signal is correct, for example whether it complies with message protocols as desired, for example with the ethernet protocol. If this is not the case, then the timing of the switch and/or the timing of the generated signal may have to be adapted.

Getting the timing right may be performed using test signals as incoming physical signals to which the system 1 should respond with a test response message. For example, if it turns out, upon analysis of the transmitted test response message, that the switch switches over from the first copy of the incoming physical signal to the generated signal too fast so that bits are missing in the test response message, the data processing system may be programmed to cause the switch to switch at a later time.

In an embodiment, a calibration may be performed for determining a correct timing for the generated signal and the switch. In such calibration, a test incoming signal, representing a test message may be input into the system. Then, a copy of the incoming signal (not the first copy or second copy described herein but a third copy) may be provided to a detector, whereas the second copy of the incoming signal is provided to a data processing system for interpreting the signal. The data processing system then detects that a message is received, determines a payload for a test response message and generates a test signal and provides this generated test signal to the detector as well. The detector can then compare the test incoming physical signal and the generated test signal in order to synchronize, e.g. bit align, these signals. The data processing system then may adjust its time delay to synchronize the signals. This time delay would then also be used by the data processing system in operation.

After performing such calibration, the data processing system knows upon detecting that an incoming message is received, when it needs to cause a switch from the first copy of the incoming physical signal to the generated signal. The data processing system may then also know which bit should be provided first by means of the generated response signal. Thus, after such calibration, the data processing system may have stored information indicating, at which particular time after detecting that an incoming message is received, the data processing system has to start generating the signal and when to cause a switch from the first copy to the generated signal, and preferably also information indicating that the first bit in the response signal that is represented by the generated signal, is the n$^{th}$ bit of the response message, n being an integer number.

FIG. 5 illustrates that the data processing system 100, based on determining that a message is received, has provided the response signal (bits J, K, L M, N, O) to the transmitter system 12 in such manner that the response signal is transmitted after the at least part of the first copy's header part has been transmitted, and such that the transmitted at least part of the first copy's header part (bytes A, B, C) and the transmitted generated signal together form a transmitted response signal representing the response message 30. The transmitted response signal may also represent a bit stream.

As is clear from a comparison of FIGS. 1 and 5, the response message 30 comprises a header portion 4 and a payload 28, and the header portion 4 of the incoming message 2 is identical to the header portion 4 of the response message 30. In this example, both header portions consist of bits A, B, C. In contrast, the payload of the response message 30 differs from the payload 6 of the incoming message 6.

It should be appreciated, however, that the system 1 is also able to send back a response message that is identical to an incoming message. When this happens, the switch 10 simply does not switch. In an example, the data processing system 100 may interpret at least part of a second copy of some incoming physical signal to determine at least part of an incoming message, e.g. at least part of a header and/or a payload, and may refrain from causing the switch 10 to switch based on the determined at least part of the incoming message.

Figure 6:
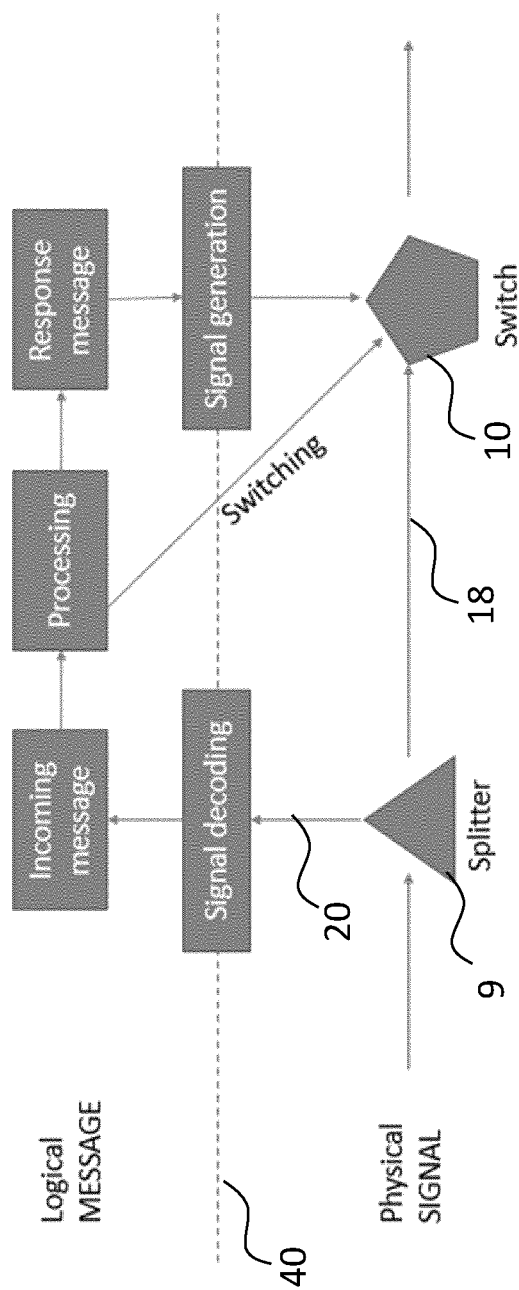
FIG. 6 clarifies a distinction between processing of a physical signal and of a logical message.

FIG. 6 clarifies a distinction between processing of a physical signal and of a logical message. In FIG. 6, the physical signal is shown to arrive at the signal splitter 9, which splits the physical signal into a first copy 18 and a second copy 20. This split may be understood to occur in the physical layer, which is conceptually shown as the area below line 40. No interpretation of the physical signal is required for splitting the signal.

FIG. 6 illustrates that the second copy 20 of the physical signal is interpreted in the sense that it is decoded. This allows to determine the incoming message, process it, and allows to determine contents of a response message. These steps may be understood to be performed on a logical level which is conceptually indicated by the area above line 40.

In the depicted embodiment, after at least part of the response message has been determined, a physical signal is generated again which can be provided to the switch 10. The switch 10 may be controlled by control signals determined during or after the processing of the response message, as shown.

The switch 10 may switch, as described herein, between providing the first copy and providing the second copy to a transmission system. The switching itself, as shown, may be understood to occur again in the physical layer, thus without requiring interpretation of the physical signals.

It should be noted that in the embodiment of FIG. 6, the first copy 18 of the physical signal remains in the physical level and is thus not interpreted before it is provided to the transmission system.

Figure 7:
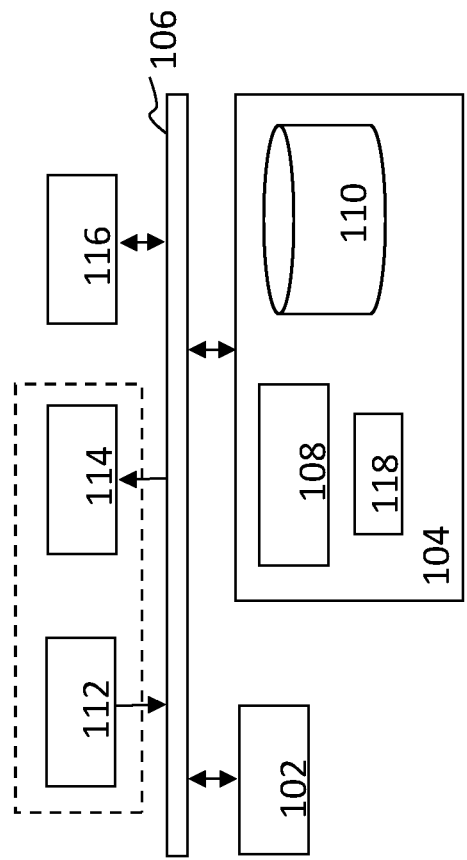
FIG. 7 illustrates a data processing system according to an embodiment.

FIG. 7 depicts a block diagram illustrating a data processing system according to an embodiment.

As shown in FIG. 7, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, a touch-sensitive display, an input 8 receiving the incoming physical signal, or the like. Examples of output devices may include, but are not limited to, a monitor or a display, speakers, the switch 10 described herein, the transmitter system 12 described herein, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 7, the memory elements 104 may store an application 118. In various embodiments, the application 118 may be stored in the local memory 108, the one or more bulk storage devices 110, or apart from the local memory and the bulk storage devices. It should be appreciated that the data processing system 100 may further execute an operating system (not shown in FIG. 7) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A method for transmitting a response message in response to an incoming message, wherein
   the incoming message comprises an incoming header portion and an incoming payload and
   the response message comprises a response header portion and a response payload, wherein
   the incoming header portion is identical to the response header portion, and wherein
   the incoming payload is different from the response payload, the method comprising:
   receiving an incoming physical signal comprising a header part of the incoming physical signal and a payload part of the incoming physical signal;
   creating a first copy of the incoming physical signal and a second copy of the incoming physical signal;
   providing the first copy of the incoming physical signal to a transmitter system so that at least part of the first copy's header part is transmitted;
   determining whether the incoming message is received by determining based on an analysis of at least part of the second copy of the incoming physical signal whether the incoming physical signal conveys the incoming message;
   generating the response payload in response to the incoming message based on determining that the incoming message was received; and
   based on determining that the incoming message was received, providing the response payload to the transmitter system so that the response payload is transmitted after the at least part of the first copy's header part has been transmitted, wherein the transmitted at least part of the first copy's header part and the transmitted response payload together form a transmitted response signal conveying the response message.

2. The method according to claim 1, wherein
   the incoming physical signal is not analyzed before creating the first copy and the second copy;
   creating the first copy of the incoming physical signal and the second copy of the incoming physical signal does not involve analysis of the incoming physical signal; and
   the first copy of the incoming physical signal is not analyzed before transmitting the at least part of the first copy's header part and not analyzed during transmitting the at least part of the first copy's header part.

3. The method according to claim 1, wherein the response payload comprises a predefined part that has already been defined before determining that the incoming message was received, said predefined part conveying at least part of the response payload.

4. The method according to claim 1, further comprising analyzing at least part of the second copy of the incoming physical signal to determine at least part of the incoming message conveyed by the incoming physical signal, and
   determining, based on the determined at least part of the incoming message, at least part of the response payload.

5. The method according to claim 1, wherein
   each of the incoming physical signal, the first and second copies of the incoming physical signal, the response payload and the transmitted response signal is a physical signal.

6. The method according to claim 1, further comprising synchronizing the response payload to the first copy of the incoming physical signal.

7. The method according to claim 1, further comprising
   based on determining that the incoming message was received, switching from (i) providing the first copy of the incoming physical signal to the transmitter system to (ii) providing the response payload to the transmitter system.

8. The method according to claim 7, wherein the switching is performed such that the transmitted response signal is correctly interpreted by a receiver.

9. The method according to claim 1, wherein the response payload is synchronized with the incoming physical signal such that the transmitted response signal is correctly interpreted by a receiver.

10. The method according to claim 9, wherein the response payload is bit aligned with the incoming physical signal.

11. The method according to claim 1, wherein the incoming physical signal is an electrical signal or a light signal.

12. The method according to claim 1, further comprising analyzing at least part of the second copy of the incoming physical signal to determine at least part of the incoming header portion.

13. The method according to claim 1, wherein the incoming physical signal, the first and second copies of the incoming physical signal, the response payload, and the transmitted response signal are each a physical signal representing a bit stream.

14. The method according to claim 1, further comprising interpreting at least part of the second copy of the incoming physical signal to determine at least part of the incoming payload.

15. The method according to claim 14, further comprising determining, based on the at least part of the incoming payload, at least part of the response payload.

16. A response system for transmitting a response message in response to an incoming message, wherein:
the incoming message comprises an incoming header portion and an incoming payload;
the response message comprises a response header portion and a response payload; and
the incoming header portion is identical to the response header portion, the response system comprising:
an input for receiving an incoming physical signal comprising a header part of the incoming physical signal and a payload part of the incoming physical signal;
a transmitter system for configured to transmit a transmitted response signal conveying the response message, wherein the response system is configured to:
create a first copy of the incoming physical signal and a second copy of the incoming physical signal; and
provide the first copy of the incoming physical signal to the transmitter system so that at least part of a first copy's header part is transmitted;
a data processing system having a processor and a memory, the data processing system configured to:
determine whether the incoming message is received by determining based on an analysis of at least part of the second copy of the incoming physical signal to whether the incoming physical signal conveys the incoming message;
generate the response payload in response to the incoming message based on determining that the incoming message was received; and
based on determining that the incoming message was received, cause the response system to provide the response payload to the transmitter system so that the response payload is transmitted after the at least part of the first copy's header part has been transmitted, wherein the transmitted at least part of the first copy's header part and the transmitted response payload together form a transmitted response signal conveying the response message.

17. The response system according to claim 16, wherein the response system is:
configured not to
analyze the incoming physical signal before the first copy and the second copy are created;
configured to create the first copy of the incoming physical signal and the second copy of the incoming physical signal without analyzing the incoming physical signal;
configured not to analyze the first copy of the incoming physical signal before transmission of the at least part of the first copy's header part; and
configured not to analyze the first copy during transmission of the at least part of the first copy's header part.

18. The response system according to claim 16, wherein the response system further comprises a switch configured to control whether or not the first copy of the incoming physical signal is provided to the transmitter system and configured to control whether or not the response payload is provided to the transmitter system, wherein the data processing system is configured to cause the response system to provide the response payload to the transmitter system by sending a control signal to the switch.

19. The response system according to claim 16, wherein the data processing system comprises a storage medium having stored thereon prestored data for inclusion in the response payload, the prestored data having been stored before the data processing system determines that the incoming message was received, wherein the data processing system is configured to generate the payload response based on the prestored data.

* * * * *